(12) United States Patent
Kennedy (10) Patent No.: US 7,818,571 B2
(45) Date of Patent: Oct. 19, 2010

(54) SECURING WIRELESS COMMUNICATIONS BETWEEN DEVICES

(75) Inventor: Kevin Kennedy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 11/704,752

(22) Filed: Feb. 9, 2007

(65) Prior Publication Data

US 2008/0195863 A1 Aug. 14, 2008

(51) Int. Cl.
*H04L 9/32* (2006.01)
*G06F 7/04* (2006.01)
*G06F 15/16* (2006.01)
*G06F 17/30* (2006.01)
*H04L 29/06* (2006.01)

(52) U.S. Cl. .......................... 713/168; 713/176; 726/4

(58) Field of Classification Search ................. 713/168, 713/176; 726/4
See application file for complete search history.

(56) References Cited

U.S. PATENT DOCUMENTS

| | | | |
|---|---|---|---|
| 6,393,484 B1 | 5/2002 | Massarani | |
| 6,654,883 B1 | 11/2003 | Tatebayashi | |
| 6,956,949 B1 | 10/2005 | Faber et al. | |
| 2003/0065918 A1 | 4/2003 | Willey | |
| 2003/0226011 A1 | 12/2003 | Kuwano et al. | |
| 2003/0236991 A1 | 12/2003 | Letsinger | |
| 2005/0149732 A1 | 7/2005 | Freeman et al. | |
| 2005/0198494 A1 | 9/2005 | Ishibashi | |
| 2006/0072745 A1 | 4/2006 | Fukaya | |
| 2006/0080549 A1 | 4/2006 | Okamura et al. | |
| 2006/0161774 A1 | 7/2006 | Huh et al. | |
| 2007/0274271 A1* | 11/2007 | Jones et al. | 370/338 |
| 2009/0119754 A1* | 5/2009 | Schubert | 726/4 |
| 2009/0217048 A1* | 8/2009 | Smith | 713/176 |

FOREIGN PATENT DOCUMENTS

GB 2408129 A * 5/2005

OTHER PUBLICATIONS

Ott, et al., "Towards Automated Authentication for Mobile Users in WLAN Hot-Spots", http://www.drive-thru-internet.org/pub/vtc2005fall-ott-kutscher.pdf.

Rekimoto, et al., "Proximal Interactions: A Direct Manipulation Technique for Wireless Networking", Date: 2003, pp. 511-518, http://www.idemployee.id.tue.nl/g.w.m.rauterberg/conferences/INTERACT2003/INTERACT2003-p511.pdf.

Valavanis, et al., "MobiShare: Sharing Context-Dependent Data & Services from Mobile Sources", http://www.mm.aueb.gr/~chris/MobiShare-IEEEWIC-WI2003.pdf.

* cited by examiner

*Primary Examiner*—Shin-Hon Chen
(74) *Attorney, Agent, or Firm*—Alleman Hall McCoy Russell & Tuttle LLP (57) ABSTRACT

The authentication of a data receiving device prior to the transfer of data from a data storage device to the data receiving device over a wireless radiofrequency communications channel is described. One disclosed embodiment comprises conducting an authentication communication exchange in which one or more of an authentication request received from the data storage device and an authentication response sent to the data storage device is transmitted via an optical communications channel. This may allow the data storage device to ensure that a data receiving device requesting the transfer of data is a desired recipient of the data before transferring the data.

19 Claims, 5 Drawing Sheets

SECURING WIRELESS COMMUNICATIONS BETWEEN DEVICES

BACKGROUND

The sharing of photographic and other data stored on mobile data storage devices, such as cell phones, cameras, personal digital assistants, etc., poses various difficulties. For example, currently a mobile device user may share such data by first transferring the data to a computer and then sharing the data by email, by uploading to a network server, etc. However, such sharing processes may take many user steps, and may be difficult to perform while a user is away from a home computer, for example, when on vacation, while at a restaurant, etc. Therefore, in these settings, photos are often shared by passing the mobile data storage device from person to person to view the photos on the device display. Due to the small size of such displays, it may be difficult for more than one or two people to simultaneously view a photograph.

Some mobile devices, such as cellular phones, may be equipped to send photographs and other such data to other devices over a cellular network. However, per transaction costs may be high for sending such data. Additionally, each transaction may involve multiple user steps. Further, the generally small sizes of mobile device displays may limit the number of persons who can view the data on the receiving device, and therefore may reduce user satisfaction with the sharing experience.

Likewise, some mobile data storage devices equipped with wireless communications technologies such as Bluetooth (IEEE 802.15.1) and WiFi (IEEE 802.11x) may be configured to allow the sharing of data with other similarly-equipped devices. However, sharing content via such technology also may involve many user steps to connect to and transfer content between devices. Eliminating steps to improve the user experience may compromise device security, as this may allow data to be automatically transferred to attackers or other unwanted recipients.

SUMMARY

Accordingly, the automatic authentication of a data receiving device prior to the transfer of data from a data storage device to the data receiving device is described below in the Detailed Description. For example, in one embodiment, a data storage device and a data receiving device connected over a wireless communications channel conduct an authentication communication exchange in which one or more of an authentication request received from the data storage device and an authentication response sent to the data storage device is transmitted via an optical communications channel. This may allow the data storage device to ensure that a device requesting the transfer of data is a desired recipient of the data before transferring the data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
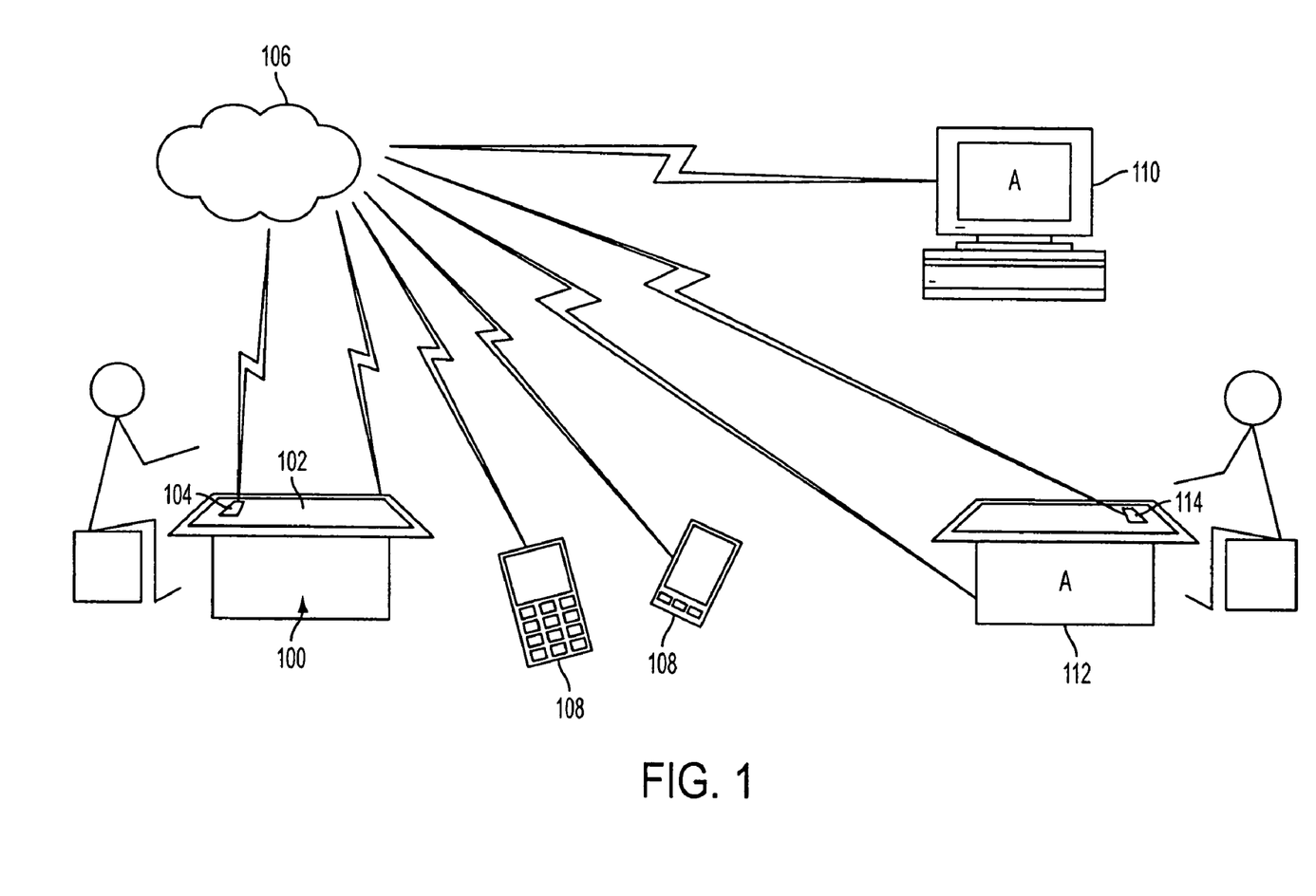
FIG. 1 shows an embodiment of an interactive display device, and an associated network environment.

FIG. 1 shows an embodiment of an interactive display device 100 configured to receive data from a mobile data storage device and to display the data to a plurality of users. FIG. 1 also illustrates an example of a network environment in which device 100 may operate. Data that may be shared via interactive display device 100 may include, but is not limited to, photographic data, video data, music and other audio data, graphical data, documents, spreadsheets, presentations, multimedia, and any other suitable type of data. Interactive display device 100 may also be configured to allow various operations to be performed on displayed data, including but not limited to editing, sending via email, transferring to other mobile data storage devices, uploading to a network server, printing, ordering printed copies over a network, etc.

Interactive display device 100 may be configured to receive data from and/or to transfer data to any suitable type of mobile data storage device. Examples of such mobile data storage devices include, but are not limited to, mobile computing devices such as laptop computers, hand-held devices, cellular phones, portable media players, personal digital assistants, cameras, video cameras, and other microprocessor-based or microcontroller-based programmable consumer electronics and/or appliances. As used herein, the term "computing device" may include any device that electronically executes one or more programs, and "data storage device" may include any device with a computer-readable storage medium capable of storing computer-readable data and/or other content. The embodiments described herein may be implemented on display device 100 and on such computing devices, for example, via computer-executable instructions or code, such as programs, stored on a computer-readable storage medium and executed by the computing device. Generally, programs include routines, objects, components, data structures, and the like that perform particular tasks or implement particular abstract data types. The term "program" as used herein may connote a single program or multiple programs acting in concert, and may be used to denote applications, services, or any other type or class of program. Interactive display device 100 may also be configured to receive data from devices other than computing devices, including but not limited to data storage devices such as flash drives, etc.

Turning again to FIG. 1, the depicted interactive display device 100 comprises a horizontal table-like top surface having a touch-sensitive display screen 102. As described in more detail below, a user may transfer data to interactive display device 100 from a suitably enabled mobile data storage device 104 simply by placing mobile data storage device 104 on touch-sensitive display screen 102. Interactive display device 100 detects the presence and location of mobile data storage device 104 on touch-sensitive display screen 102, connects to mobile data storage device 104 via a wireless communications channel 106, receives data from mobile data storage device 104 over wireless communications channel 106, and displays the data on touch-sensitive display screen 102. The data then may be viewed, and in some embodiments, manipulated, via touch-sensitive display screen 102 by a group of persons (one of which is illustrated in FIG. 1) seated around interactive display device 100. In this manner, photographs and other data stored on mobile data storage device 104 may be shared by a group of users in a simple and intuitive manner.

The term "data receiving device" may be used herein to describe the role of interactive display device 100 in communications with a mobile data storage device, but it will be appreciated that interactive display device 100 may also be configured to transfer data to other devices. Further while described herein in the context of an interactive display device having a horizontal, table-like display surface, it will be appreciated that interactive display device 100 may include a display having any other suitable orientation, including vertical and diagonal orientations.

At times, one or more mobile data storage devices 108 may be detected on wireless communications channel 106 but not located on touch-sensitive display screen 102. Likewise, various malicious attacking devices, such as remote computing device 110 (labeled "A" for attacker) may connect to mobile storage devices 104 and/or 108 over wireless communications channel 106 to attempt to trick the devices into transferring data to the attacking device. Likewise, an attacker may place an unauthorized interactive display device 112 in a public place to attempt to steal data from the portable data storage devices 114 of unsuspecting users.

In order to secure communications between a legitimate or authorized interactive display device 100 and a mobile data storage device 104 placed on the surface of the interactive display device 100, each device 100 and 104 may be configured to authenticate the other device before any data is transferred between devices. Such an authentication process may help interactive display device 100 to distinguish a mobile data storage device 104 that is located on touch-sensitive display screen 102 from devices 108 not placed on touch-sensitive display screen 102. Furthermore, such a process may also allow mobile data storage device 104 to confirm that it is located on and in communication with a trusted interactive display device 100, rather than a malicious device 110, 112, before transferring data.

Any suitable communications mechanism or mechanisms may be used by mobile data storage device 104 and interactive display device 100 to conduct an authentication communications exchange. Suitable mechanisms include communications over channels other than wireless communications channel 106 that are sensitive to a presence and location of mobile data storage device 104 on display 102. For example, in one embodiment, interactive display device 100 and mobile data storage device 104 may conduct an authentication communication exchange in which interactive display device 100 modulates an optical source in a manner detectable by an on-board image capture device, such as a camera, on mobile data storage device 104. Alternatively and/or additionally, mobile data storage device 104 may include an optical or electromagnetic emitter that emits a signal detectable by the touch-sensitive mechanism of interactive display device 100 when mobile data storage device 104 is positioned on display 102.

Mobile data storage device 104 and interactive display device 100 may be configured to conduct any suitable authentication communication exchange. For example, mobile data storage device 104 and interactive display device 100 may be configured to conduct a challenge-response communication exchange in which one or more of a challenge message and a response message is transferred over the location-sensitive secondary communications channel.

As another example, interactive display device 100 and mobile data storage device 104 may be configured to conduct a public/private key communication exchange in which an item of data is sent to interactive display device 100 via wireless communications channel 106, is encoded by interactive display device 100 with a private key, and then sent back to mobile data storage device 104 via modulation of an optical source in interactive display device 100. The item of data may then be received by mobile data storage device 104 via an on-board camera or light detector, and then decoded by mobile data storage device 104 with the public key of interactive display device 100 to authenticate interactive display device 100. It will be appreciated that these specific authentication communications are described herein for the purpose of example, and that any other suitable authentication message exchange may be used.

Figure 2:
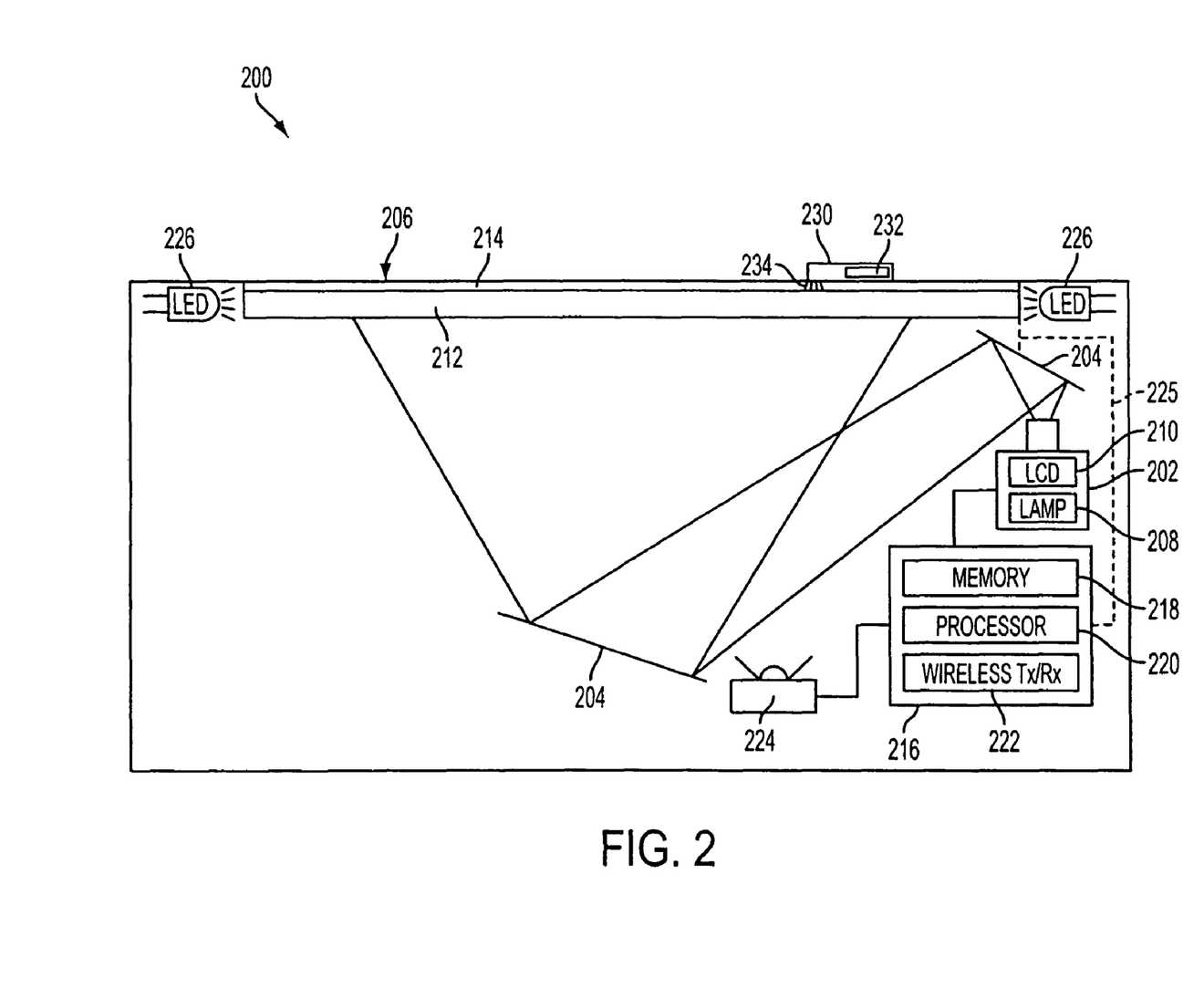
FIG. 2 shows a schematic diagram of an embodiment of an interactive display device.
Figure 3:
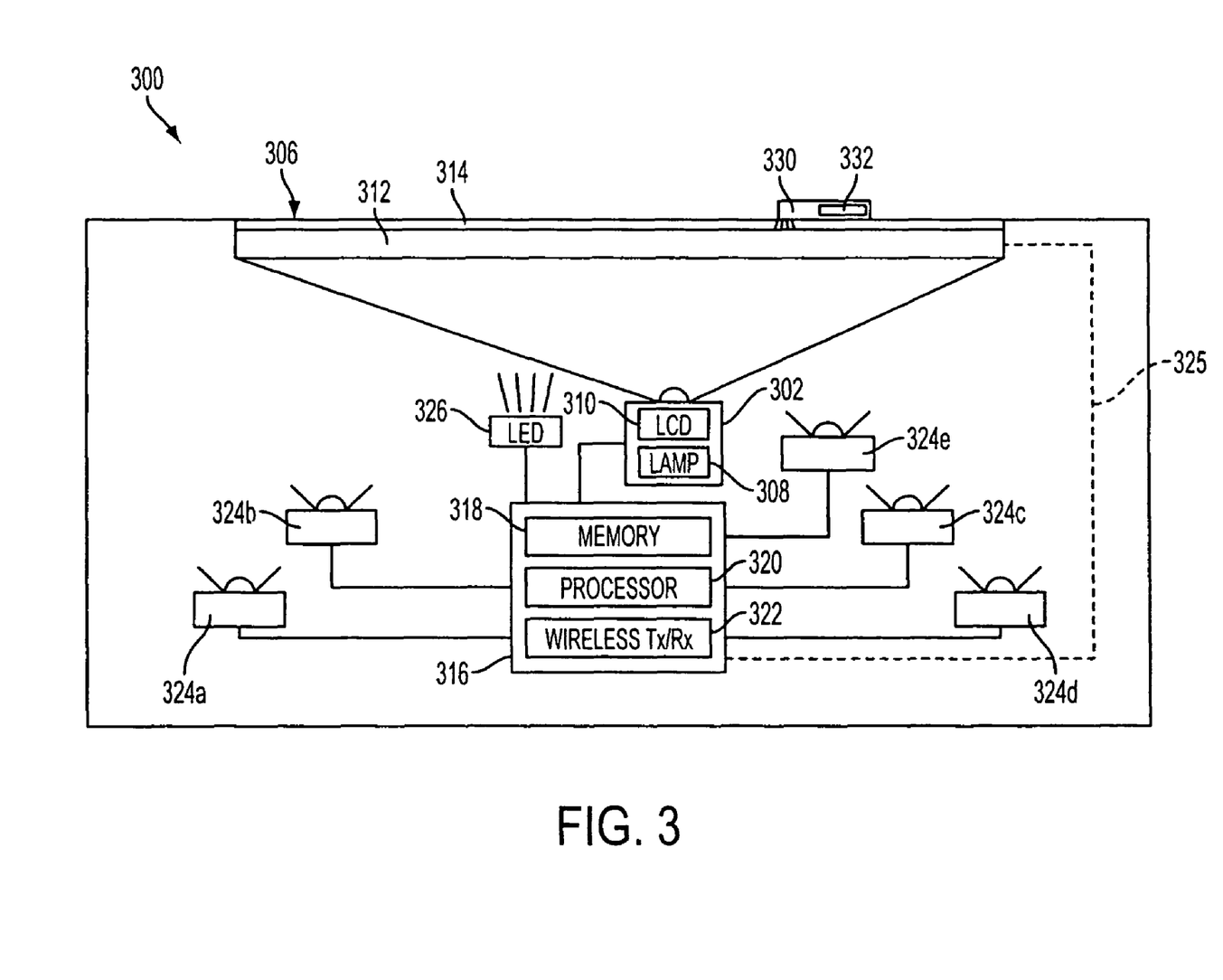
FIG. 3 shows a schematic diagram of another embodiment of an interactive display device.

FIGS. 2 and 3 show schematic depictions of embodiments of interactive display devices 200 and 300 with optical sources and touch-sensing mechanisms that may be used to communicate with a suitably enabled mobile data storage device over a second communications channel. First referring to FIG. 2, interactive display device 200 comprises a projection display system having an image source 202, optionally one or more mirrors 204 for increasing an optical path length and image size of the projection display, and a display screen 206 onto which images are projected.

Image source 202 includes an optical or light source 208 such as the depicted lamp, an LED array, or other suitable light source. Image source 202 also includes an image-producing element 210 such as the depicted LCD (liquid crystal display), an LCOS (liquid crystal on silicon) display, a DLP (digital light processing) display, or any other suitable image-producing element. Display screen 206 includes a clear, transparent portion 212, such as sheet of glass, and a diffuser screen layer 214 disposed on top of the clear, transparent portion 212. In some embodiments, an additional transparent layer (not shown) may be disposed over diffuser screen layer 214 to provide a smooth look and feel to the display surface.

Continuing with FIG. 2, interactive display device 200 further includes an electronic controller 216 comprising memory 218 and a microprocessor 220. Further, controller 216 may include a wireless transmitter and receiver 222 configured to conduct two-way communication with mobile data storage devices. Wireless transmitter and receiver 222 may be configured to conduct wireless communications with mobile data storage device in any suitable manner, including but not limited to via 802.11x, Bluetooth, radiofrequency identification (RFID) communications devices, cellular telephone network, or other radiofrequency communications technologies. While shown as part of controller 216, it will be appreciated that wireless transmitter and receiver 222 may also be provided as a separate device in electrical communication with controller 216.

To sense objects placed on display screen 206, interactive display device 200 includes an image capture device 224 configured to capture an image of the entire backside of display screen 206, and to provide the image to electronic controller 216 for the detection of objects appearing in the image. Diffuser screen layer 214 helps to avoid the imaging of objects that are not in contact with or positioned within a few millimeters of display screen 206, and therefore helps to ensure that only objects that are touching display screen 206 are detected by image capture device 224.

Image capture device 224 may include any suitable image sensing mechanism. Examples of suitable image sensing mechanisms include but are not limited to CCD and CMOS image sensors. Further, the image sensing mechanisms may capture images of display screen 206 at a sufficient frequency to detect motion of an object across display screen 206. Display screen 206 may alternatively or further include an optional capacitive, resistive or other electromagnetic touch-sensing mechanism, as illustrated by dashed-line connection 225 of screen 206 with controller 216.

Image capture device 224 may be configured to detect reflected or emitted energy of any suitable wavelength, including but not limited to infrared and visible wavelengths. To assist in detecting objects placed on display screen 206, image capture device 224 may further include an additional optical source or emitter such as one or more light emitting diodes (LEDs) 226 configured to produce infrared or visible light. Light from LEDs 226 may be reflected by objects placed on display screen 206 and then detected by image capture device 224. The use of infrared LEDs as opposed to visible LEDs may help to avoid washing out the appearance of projected images on display screen 206.

LEDs 226 may be positioned at any suitable location within interactive display device 200. In the depicted embodiment, a plurality of LEDs 226 are placed along a side of display screen 206. In this location, light from the LEDs can travel through display screen 206 via internal reflection, while some can escape from display screen 206 for reflection by an object on the display screen 206. In alternative embodiments, one or more LEDs may be placed beneath display screen 206 so as to pass emitted light through display screen 206.

FIG. 2 also depicts a mobile data storage device 230 that has been placed on display screen 206. Mobile data storage device 230 includes a wireless transmitter and receiver 232 configured to communicate with wireless transmitter and receiver 222 on interactive display device 200, and also includes a light detector, such as on-board camera 234 or other light-sensitive device, configured to detect light from display screen 206. Alternatively or additionally, mobile data storage device 230 may include an optical and/or electromagnetic emitter configured to emit a signal detectable by image capture device 224 or other touch-sensitive mechanism.

FIG. 3 shows a schematic depiction of another embodiment of an interactive display device 300 that utilizes an optical touch sensing mechanism. Interactive display device 300 comprises a projection display system having a wide angle image source 302 and a display screen 306 onto which images are projected. Image source 302 includes an optical, or light, source 308 and an image-producing element 310. Display screen 306 includes a transparent glass structure 312 and a diffuser screen layer 314 disposed thereon.

Continuing with FIG. 3, interactive display device 300 includes an electronic controller 316 comprising memory 318 and a microprocessor 320. Further, interactive display device 300 includes a wireless transmitter and receiver 322 configured to conduct two-way communication with mobile data storage devices, such as device 330 via wireless transmitter and receiver 332 on device 330.

Interactive display device further includes a plurality of image capture devices, depicted as 324a-324e, and an optical emitter such as an LED array 326 configured to illuminate a backside of display screen 306 with infrared or visible light. Image capture devices 324a-e are each configured to capture an image of a portion of display screen 306 and provide the image to controller 316, and to assemble a composite image of the entire display screen 306 from the images. In the depicted embodiment, image capture devices 324a-d are positioned generally beneath the corners of display screen 306, while image capture device 324e is positioned in a location such that it does not pick up glare from LED array 326 reflected by display screen 306 that may be picked up by image capture devices 324a-d. In this manner, images from image capture devices 324a-e may be combined by controller 316 to produce a complete, glare-free image of the backside of display screen 306. This allows detection of an object such as a mobile data storage device 330 placed on display screen 306. Display screen 306 may alternatively or further include an optional capacitive, resistive or other electromagnetic touch-sensing mechanism, as illustrated schematically by dashed-line connection 325 of screen 306 with controller 316.

In the embodiments of FIGS. 2 and 3, image sources 202 and 302, visible optical sources 208 and 308, infrared optical sources 226 and 326, image capture devices 224 and 324a-e, and/or an electronically sensitive touch sensing mechanism disposed within touch-sensitive display screen 206 or 306, may each act as a location-sensitive second communications device, as each of these structures may be capable of transmitting and/or receiving communications in a manner sensitive to a precise location of the mobile data storage device on the display screen.

Figure 4:
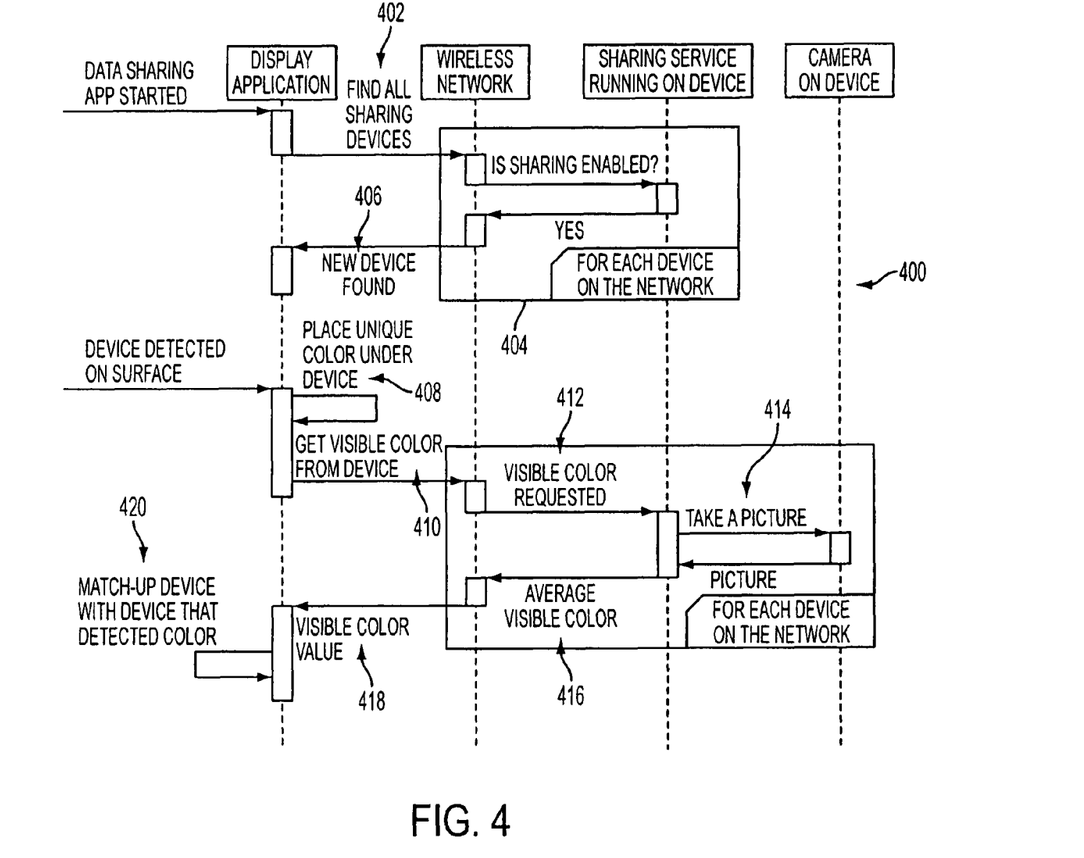
FIG. 4 shows a process flow of an embodiment of a method for an interactive display device to authenticate a data storage device placed on the surface of the interactive display device.
Figure 5:
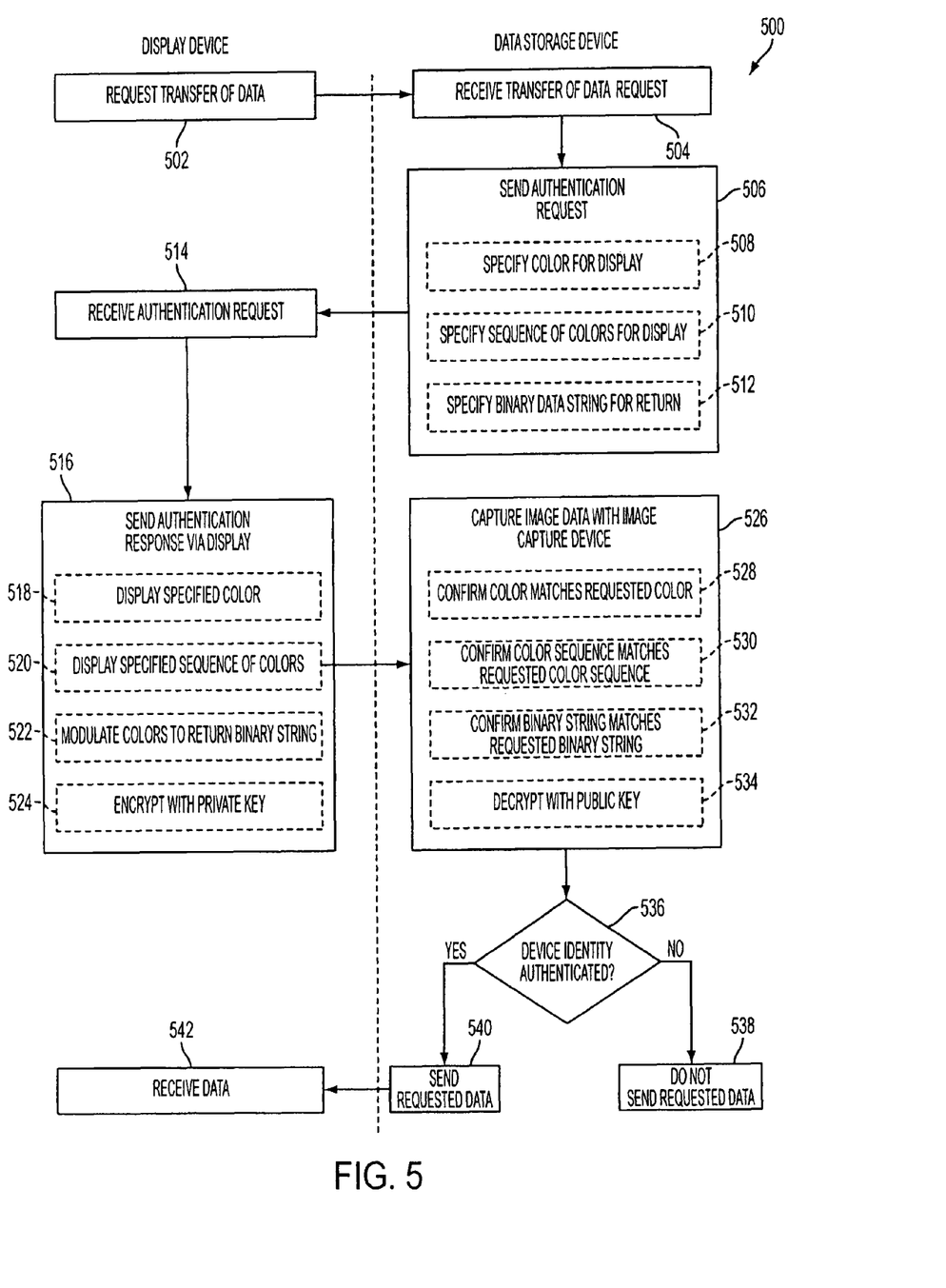
FIG. 5 shows a process flow of an embodiment of a method for a data storage device to authenticate an interactive display device on which the data storage device is placed.

Referring next to FIGS. 4 and 5, FIG. 4 illustrates an embodiment of an example of a method for an interactive display device to authenticate a mobile data storage device, and FIG. 5 illustrates an embodiment of an example of a method for a mobile data storage device to authenticate an interactive display device. The embodiments of FIG. 4 and FIG. 5 employ an on-board image capture device on the mobile data storage device and a display on the interactive display device to communicate one or more messages in an authentication exchange. However, it will be appreciated that the concepts described may also be implemented via an optical emitter located on the mobile data storage device and an image capture device located on the interactive display device. Furthermore, it will be understood that the concepts may also be implemented by an electromagnetic emitter on the mobile data storage device and an electromagnetic-sensitive touch-sensitive mechanism, such as a capacitive, conductive or resistive touch-screen detection mechanism, or by any other suitable location-sensitive communications device.

First regarding FIG. 4, a process flow is shown depicting an embodiment of a method 400 for an interactive display device to authenticate a mobile data storage device located on the surface of an interactive display device via a camera provided on the mobile data storage device. Processes performed by programs running on interactive display device are shown in a left-most portion of FIG. 4; communications via wireless network between the interactive display device and the mobile data storage device are shown in a left-center portion of FIG. 4; processes performed by a data sharing service on mobile data storage device are shown in a right-center portion of FIG. 4; and processes performed by the camera on the mobile data storage device are shown in a right-hand portion of FIG. 4.

Method 400 begins at 402 with the interactive display device application finding all mobile data storage devices enabled to share data with the interactive display device. The interactive display device application may find these devices, for example, by periodically sending a beacon over the wireless network, or by sending a beacon over the wireless network when an object is detected on the touch-sensitive display of the interactive display device. Next, as indicated at 404, if the mobile data storage device includes a sharing service and the sharing service is enabled, the mobile device returns a message to display application at 406 alerting the display application of its presence. Processes 402-406 are performed for each mobile data storage device that receives the beacon and that has its sharing service enabled.

Next, at each detected object on the display screen, interactive display device may display a unique color or image beneath the object, as indicated at 408. Then, as indicated at 410, the interactive display device may send a request to the sharing service on each detected mobile data storage device for the device to capture an image and send a message related to the captured image back to the interactive display device.

Upon receipt of this instruction, the sharing service on each detected mobile data storage device directs its camera to collect an optical sample by taking a picture, as indicated at 412. Next, as shown at 414, the camera takes the picture and returns the picture to the mobile device sharing service. In some embodiments, the sharing service may perform some processing of the optical sample, or may acquire data from the optical sample, such as an average of the colors in the image, as shown at 416.

Next, the mobile data storage device sharing service sends the image, data acquired from the image, or another such locating message related to the image, back to the interactive display device over the wireless network, as shown at 418. Finally, as indicated at 420, the interactive display device can then match the image (or data acquired from the image) to the image that was displayed under the detected object to determine which, if any, of the mobile data storage devices detected on the wireless network corresponds to the detected object.

Where more than one object is detected on the display surface of the interactive display device, method 400 may also be used to identify and locate each mobile data storage device that is placed on interactive device and distinguish those devices from other objects detected on interactive display device 400, for example, by displaying different colors under each detected object.

In some embodiments, the interactive display device may display a timed sequence of colors under the detected object, rather than a single color. As another alternative, the interactive display device may be configured to modulate the output from LEDs (such as LEDs 326 and 426 shown in FIGS. 3 and 4), and the mobile data storage device may detect the modulated LED output with its on-board camera. Furthermore, the interactive display device may use different techniques for choosing and displaying the color beneath the device to determine if a color works best for a selected device. Additionally, the sharing service on the mobile data storage device may be configured to process the image acquired by the mobile data storage device camera to facilitate the identification of the color displayed beneath it. For example, such processing may include, but is not limited to, ignoring blown highlights, ignoring areas with no color, or clamping the color values to a specific set of colors. Likewise, the mobile data storage device's sharing service may be configured to return an error message or no response if the mobile data storage device's camera is unable to see a color of sufficient uniformity.

Additionally, in some embodiments, a user may be provided with the option of disabling the secondary communications channel to prevent unauthorized or unintentional communication with the interactive display device. This may provide a user with more control over whether content from the user's device is downloaded to the interactive display device.

Through method 400, an interactive display device can authenticate a mobile data storage device before receiving data transferred from the mobile data storage device. This may help to ensure that data is not transferred from another detected mobile data storage device that is not placed on the interactive display device. However, method 400 may not help to prevent a mobile data storage device from transferring data to an attacker, such as attacker 110 or 112, configured to mimic the communications of method 400.

Therefore, FIG. 5 shows a process flow depicting an embodiment of a method 500 for a mobile data storage device to authenticate an interactive display device before transferring data to the interactive display device. In FIG. 5, processes performed by the interactive display device are shown in a left-side column, and processes performed by the mobile data storage device are shown in a right-side column. Method 500 first comprises, at 502, the interactive display device (or attacking device) sending a message to the mobile data storage device over a wireless communications channel requesting the transfer of data. The data requested may be content such as image data, music data, spreadsheets, documents, presentations, etc., or any other request for any other type of data.

Upon receipt of the request to transfer data at 504, the mobile data storage device sends an authentication request to the interactive display device at 506 over the wireless communications channel. The authentication request may comprise, for example, a challenge to the interactive display device to send a response to the challenge via an optical emitter, such as a visible or infrared optical source, within the interactive display device. Examples of such authentication challenges include, but are not limited to, a request for the interactive display device to display a specified color on the display (as indicated at 508), to specify a sequence of colors to display on the display (as indicated at 510), or to specify a binary sequence of bits for the interactive display device to return (as indicated at 512) over the location-sensitive second communication channel, for example, by modulating a visible or infrared optical source between two colors, two shades of color, two images, etc.

The interactive display device receives the authentication request at 514, and then sends an authentication response to the mobile data storage device via its display. For example, where the authentication challenge was a request to display a specified color, the interactive display device may display, at 518, an image of the specified color on the display at a location beneath the mobile data storage device, or in any other location detectable by the mobile data storage device's camera. Likewise, where the authentication challenge was a request to display a sequence of colors or a binary string, the interactive display device may display images of the requested series of colors, or a representation of the binary string via a suitable modulation of displayed colors or other images, beneath the mobile data storage device, as indicated at 520 or 522.

Further, as indicated at 524, in some embodiments the interactive display device may be configured to encrypt the response message. For example, the sharing service that enables the mobile data storage device to communicate with the interactive display device may have an associated public key and private key. In this manner, the interactive display device may encrypt its response to the challenge message via the private key. Upon receipt of the response message by the mobile data storage device, the mobile data storage device verifies the data using the public key. If the signature is verified, the mobile data storage device knows that the device requesting the data transfer is a valid "sharing services" participant before transferring data. This may help a user of a mobile data storage device avoid transferring data to an unauthorized interactive display device placed in a public location by an attacker, such as that shown at 112 in FIG. 1.

Continuing with FIG. 5, after the authentication response is sent by the interactive display device, the mobile data storage device captures an image or a series of images, as indicated at 526, and then compares, at 536, the captured image or series of images to the authentication challenge previously sent. These processes may include, for example, confirming at 528 whether a color of (or average color of) the image captured matches the color requested to be displayed, whether a sequence of colors detected matches the sequence of colors requested in the challenge message (as indicated at 530), and/or whether a modulation of an optical output of the interactive display device matches a requested string of binary data (as indicated at 532). Further, where public/private key authentication is enabled, the received message may be decrypted using the sharing service public key, as indicated at 534, to verify that the interactive display device is an authorized device.

If the response message received from the interactive display device does not meet the challenge sent to the interactive display device, then the mobile data storage device may ignore the request to send data received at 504 and not transfer the requested data, as indicated at 538. On the other hand, if the authentication message received by the mobile data storage device meets the authentication request, then the mobile data storage device may send the requested data, as indicated at 540. This data is then received at 540 by the interactive display device, which may then display the data.

To further ensure security, private and public keys used by interactive display devices and may be updated periodically by a trusted authority. Furthermore, such an authority may re-provision the public and private keys if there is belief that the private keys have been compromised. In the event that keys are updated, the interactive display devices may keep older keys so that mobile data storage devices that have not yet been updated to the latest keys will continue to be supported. In these embodiments, the mobile data storage device may be configured to inform the interactive display device which keys it wishes to use for the authentication process.

While the embodiments of FIGS. 4 and 5 are described in the context of conducting an authentication communication exchange by detecting images displayed on a display with an on-board camera, it will be appreciated that the methods disclosed herein may also be used with other secondary communication channels. For example, in some embodiments, an authentication request may be sent from a mobile data storage device to an interactive display device via an infrared or visible emitter disposed on the mobile data storage device. Such a request may be detected by an optical touch-sensing mechanism. Alternatively and/or additionally, an authentication communication may be sent via an electromagnetic transmitter on a data storage device and received via a suitable electrical touch-screen device, such as a capacitive, resistive or conductive touch-screen device. Further, in some embodiments, a mobile data storage device may communicate over an optical communications channel via a simple light or color detector, rather than via an on-board camera.

Further, while described in the context of the transfer of data from a mobile data storage device to an interactive display device, it will be appreciated that the concepts disclosed herein may be used to secure communications between any other suitable devices. It will be appreciated that the specific display device configurations shown and described herein are set forth for the purpose of example, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a data receiving device, a method of securing communications between the data receiving device and a data storage device, the method comprising:
connecting to the data storage device over a first, wireless radio frequency communications channel;
receiving an authentication request from the data storage device via the first, wireless radio frequency communications channel, the authentication request comprising a request to send an authentication response over a second, optical communications channel by displaying a specified image on a display of the data receiving device; and
sending the authentication response by displaying the specified image for capture by an on-board camera of the data storage device.

2. The method of claim 1, wherein the display comprises a touch-sensitive interface, further comprising detecting a location of an object placed on the display and displaying the specified image at a location on the display beneath or adjacent to the object.

3. The method of claim 1, wherein the authentication request comprises a request to display a specified sequence of images on the display, and wherein the authentication response comprises displaying the specified sequence of images on the display.

4. The method of claim 3, wherein the specified sequence of images represents a specified sequence of binary values.

5. The method of claim 3, further comprising encrypting the specified sequence of images via a private key.

6. The method of claim 1, wherein the specified image comprises one or more of a specified color and a specified shade of color.

7. In a data storage device, a method of securing communications between the data storage device and a data receiving device, the method comprising:
connecting to the data receiving device via a wireless radio frequency communications channel; and
conducting an authentication communication exchange with the data receiving device in which one or more of an authentication request sent to the data receiving device and an authentication response received from the data receiving device is transmitted via an optical communications channel comprising an on-board camera of the data storage device.

8. The method of claim 7, wherein the authentication request is sent via the wireless radiofrequency communications channel and comprises a request to display a specified image on a display, and wherein the authentication response is received via the optical communications channel as a capture of the specified image.

9. The method of claim 8, wherein the specified image comprises one or more of a specified color and a specified shade of color.

10. The method of claim 8, wherein the authentication request comprises a request to display a specified sequence of images on the display.

11. The method of claim 8, further comprising detecting the specified image via the on-board camera.

12. The method of claim 11, further comprising transmitting data to the data receiving device only if the specified image is detected.

13. The method of claim 8, wherein the authentication response is encoded via a private key.

14. An interactive display device, comprising:

a touch-sensitive display system comprising a display, a touch-sensing mechanism configured to detect a location of an object placed on the display, and an optical emitter;

a wireless communications system; and a controller configured to conduct an authentication communication exchange with a data storage device located on the display and detected via the wireless communications system and the touch-sensing mechanism, the controller including instructions stored in controller memory and executed by a controller processor to:

receive an authentication request from the data storage device, the authentication request including a request to transmit an authentication response, the authentication response comprising an optical emission via the optical emitter, and transmit the authentication response by emitting the authentication response through the display via the optical emitter.

15. The device of claim 14, wherein the optical emitter is an image source configured to produce an image for display.

16. The device of claim 15, wherein the controller is configured to transmit the authentication response by displaying on the display one or more images specified in the authentication request.

17. The device of claim 14, wherein the optical emitter is an infrared source configured to illuminate at least a portion of the display with infrared light.

18. The device of claim 17, wherein the controller is configured to transmit the authentication response by modulating the infrared light emitted by the infrared source.

19. The device of claim 14, wherein the controller is configured to sign the authentication response with a private key.

* * * * *